W. P. HUGUELET.
CUTTING DEVICE.
APPLICATION FILED NOV. 10, 1916.
1,258,569.
Patented Mar. 5, 1918.
6 SHEETS—SHEET 1.
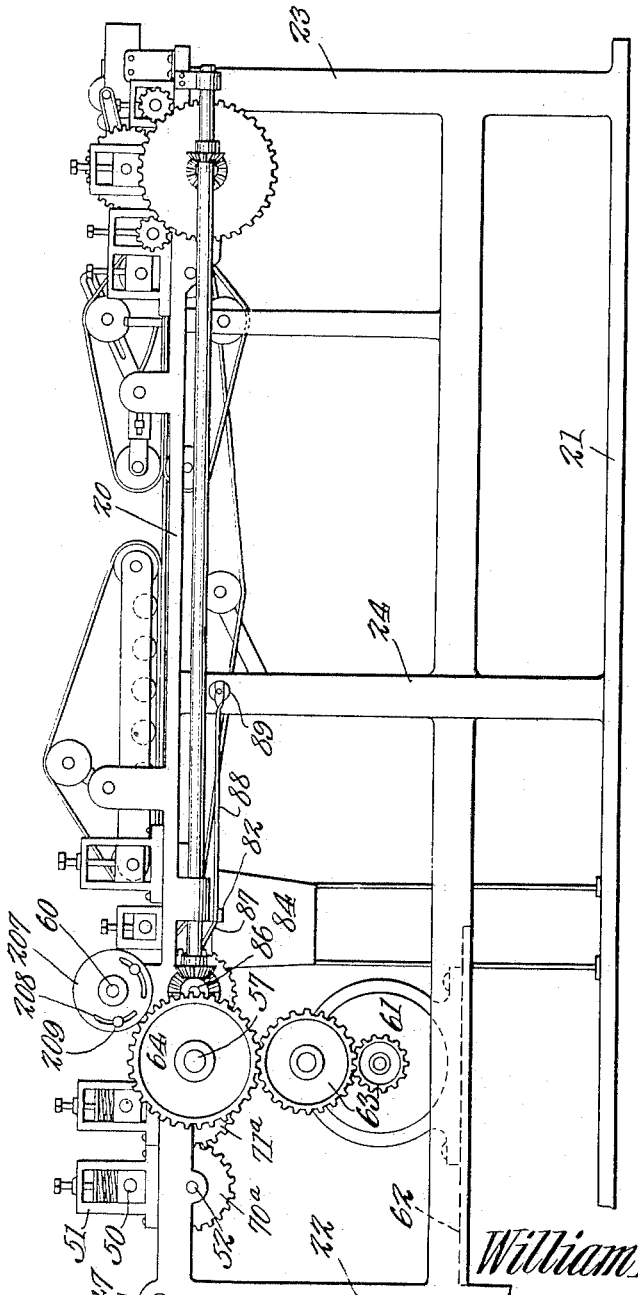
Fig. 1.
William P. Huguelet
INVENTOR
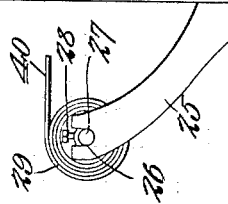

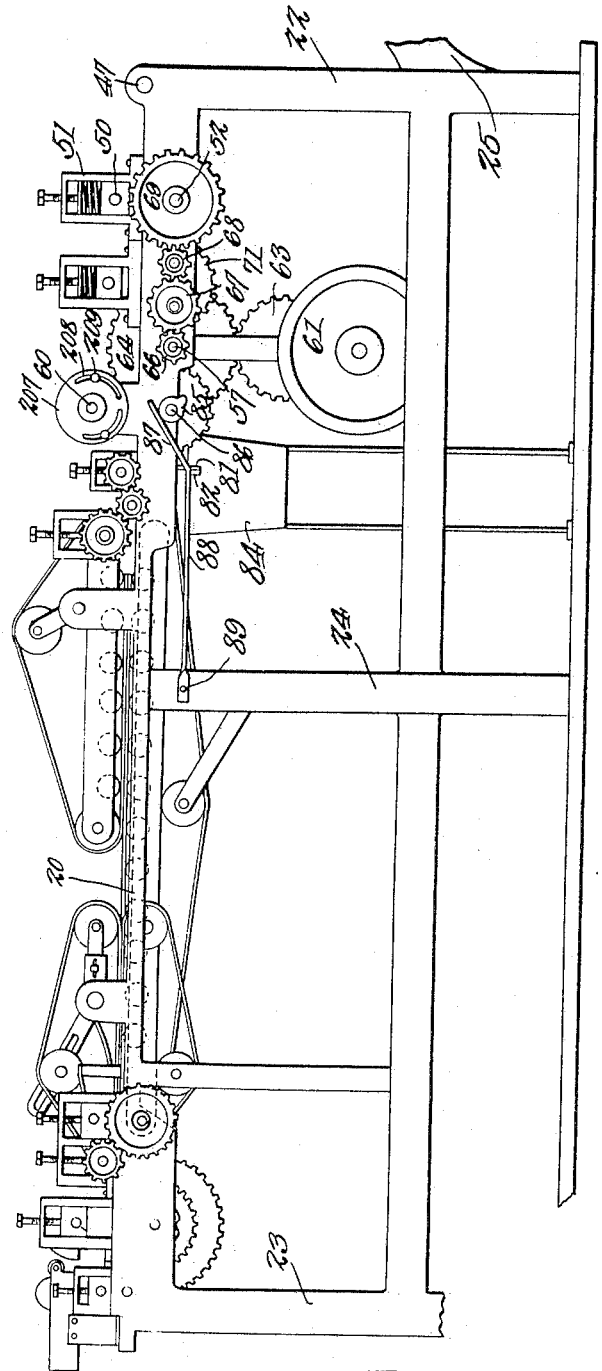

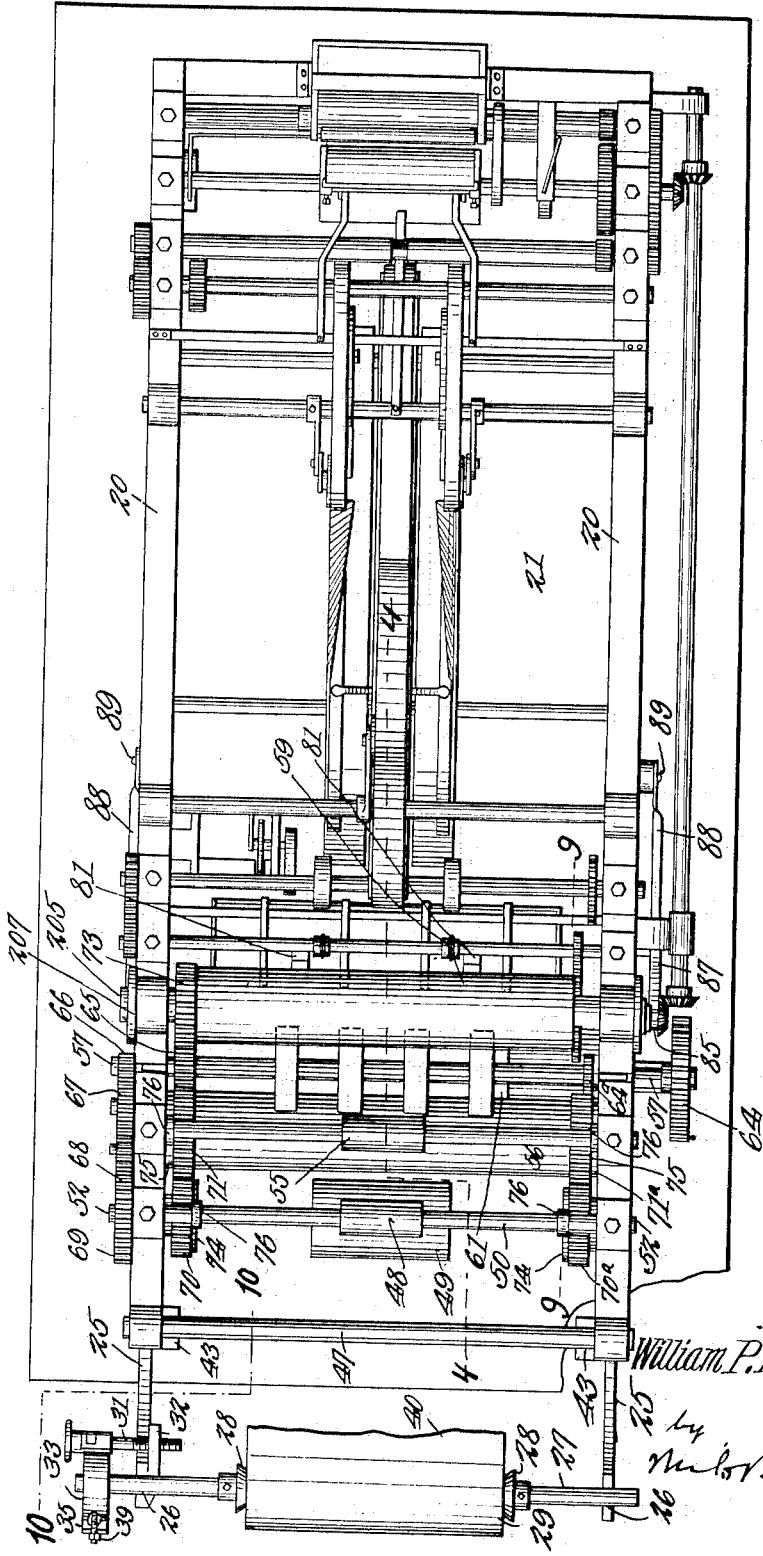

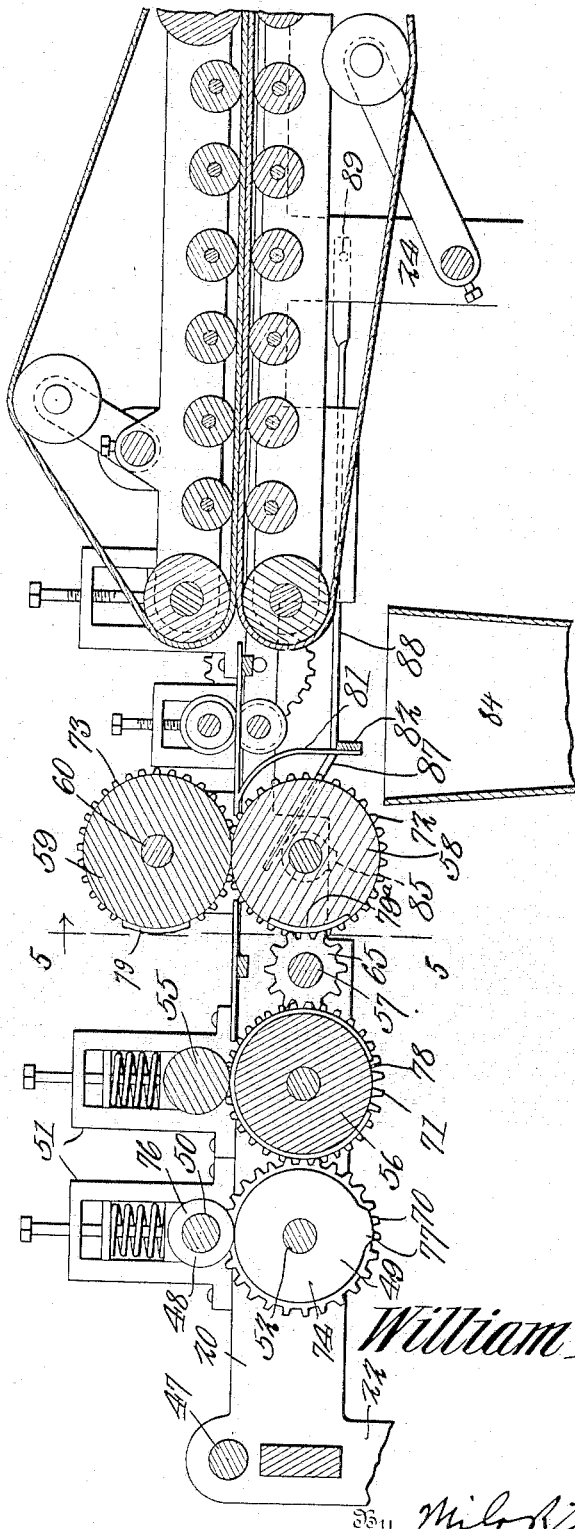

W. P. HUGUELET.
CUTTING DEVICE.
APPLICATION FILED NOV. 10, 1916.
1,258,569.
Patented Mar. 5, 1918.
6 SHEETS—SHEET 5.
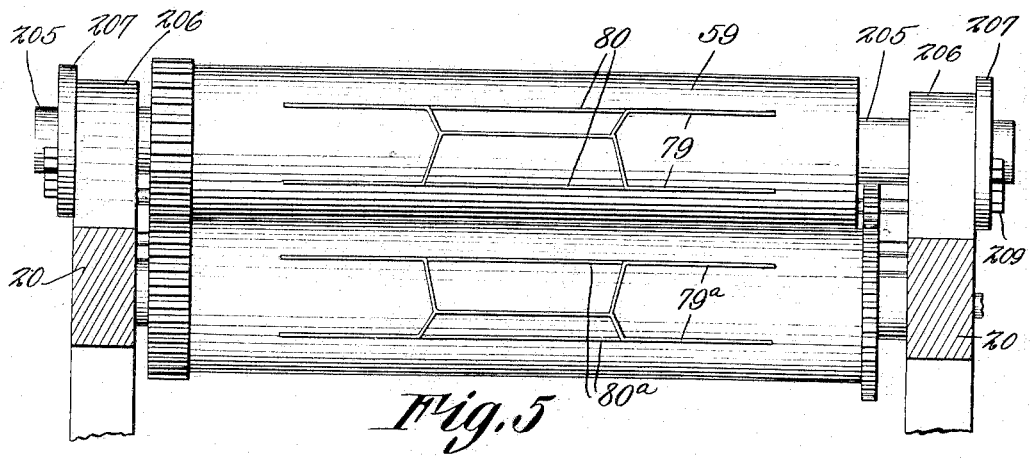
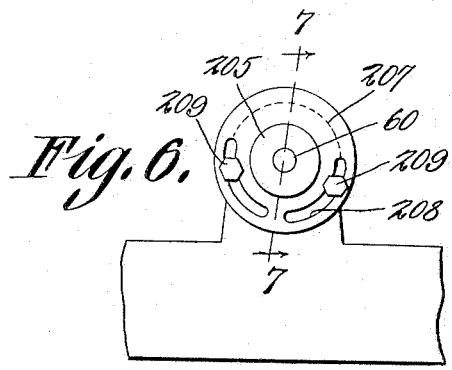
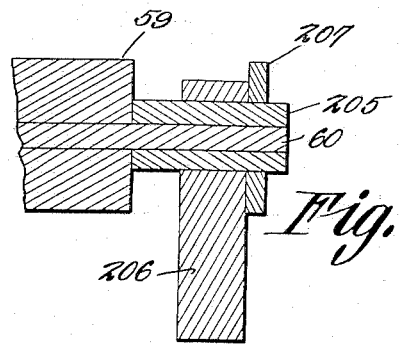
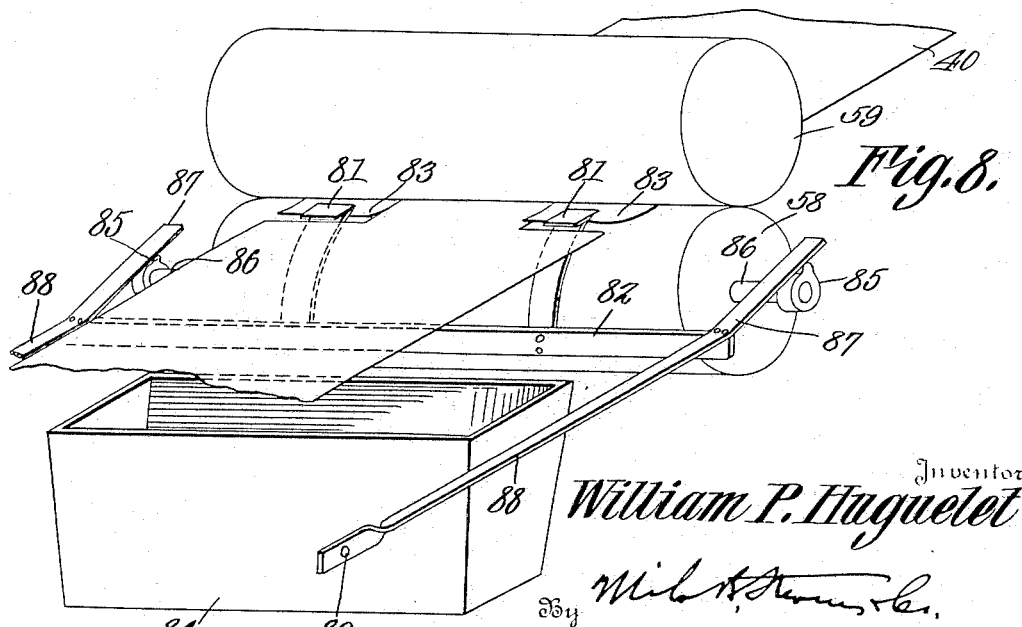
Inventor
William P. Huguelet
By
Attorneys

W. P. HUGUELET.
CUTTING DEVICE.
APPLICATION FILED NOV. 10, 1916.

1,258,569.

Patented Mar. 5, 1918.
6 SHEETS—SHEET 6.

William P. Huguelet
Inventor,

By
Attorneys

UNITED STATES PATENT OFFICE.

WILLIAM P. HUGUELET, OF CHICAGO, ILLINOIS.

CUTTING DEVICE.

1,258,569.   Specification of Letters Patent.   Patented Mar. 5, 1918.

Original application filed May 9, 1916, Serial No. 96,378. Divided and this application filed November 10, 1916. Serial No. 130,592.

*To all whom it may concern:*

Be it known that I, WILLIAM P. HUGUELET, a citizen of the United States, residing at Chicago, in the county of Cook and State of Illinois, have invented new and useful Improvements in Cutting Devices, of which the following is a specification.

This invention relates to machines which make envelops from a continuous web by means of rotary elements which latter cut out the blanks, and gum and fold the same to complete the envelops.

The present application is a division of the application filed May 9, 1916, Serial No. 96378, and it relates more particularly to the cutting mechanism which forms the envelop blanks from a strip of paper or other material, the cutter being shaped to cut out opposite portions at the edges of the strip, and to sever the strip transversely intermediate said cut out portions, thereby forming a blank having side flaps and top and bottom flaps, the side flaps being foldable on each other after gumming one of said flaps, and the bottom flap being foldable on the top of the folded side flaps, and being pasted thereto.

The invention also has for its object to provide a novel and improved means for feeding the strip of paper to the cutting mechanism, as will be described in detail hereinafter.

In order that the invention may be better understood, reference is had to the accompanying drawings forming a part of this specification.

In the drawings—

Figure 1 is an elevation showing one side of the machine;

Fig. 2 is an elevation showing the opposite side;

Fig. 3 is a plan view of the machine;

Fig. 4 is an enlarged longitudinal section on the line 4—4 of Fig. 3;

Fig. 5 is a cross-section on the line 5—5 of Fig. 4;

Fig. 6 is an end view of certain parts shown in Fig. 5;

Fig. 7 is a vertical section on the line 7—7 of Fig. 6;

Fig. 8 is a perspective view showing a device for removing the cut-out portions of the strip;

Figure 9:
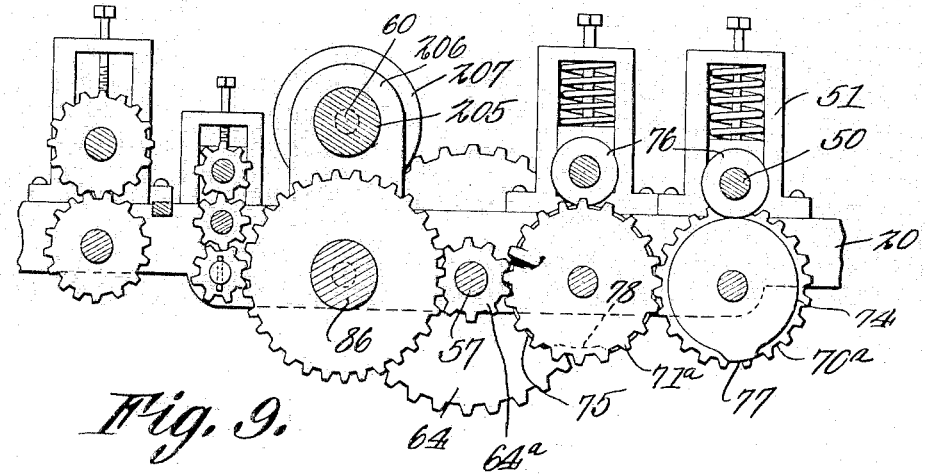
Figure 10:
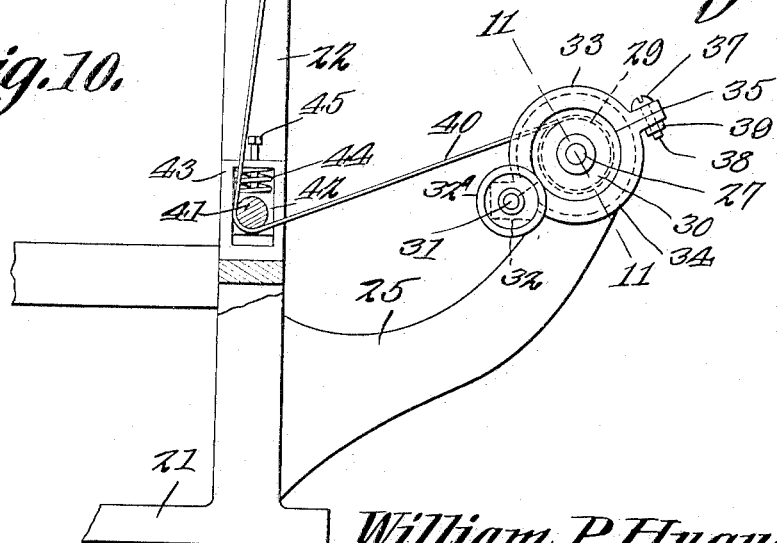
Figure 11:
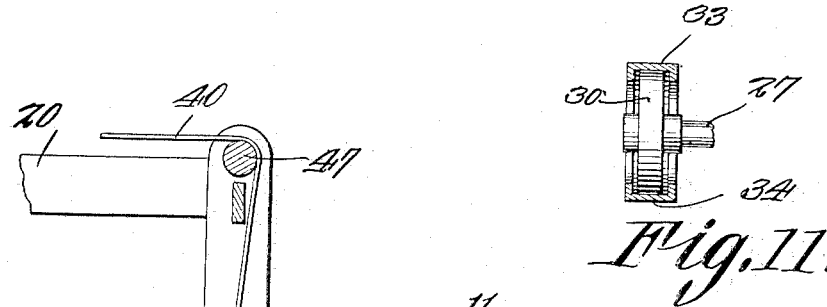

Figs. 9 and 10 are sectional details on the lines 9—9 and 10—10, respectively, of Fig. 3, and Fig. 11 is a section on the line 11—11 of Fig. 10.

Referring specifically to the drawings, the frame of the machine comprises laterally spaced side members having a base 21, a top rail 20, end uprights 22 and 23, respectively, and an intermediate upright 24, these parts being usually cast in one piece.

Extending forward from the uprights 22 are brackets 25 having at their outer ends bearing recesses 26 for a horizontal shaft 27 extending transversely of the machine and carrying cones 28 which support the roll 29 of paper from which the envelops are to be made. The shaft 27 is provided with a take-up or braking device consisting of a drum 30 mounted on one end of said shaft and engageable by a split band composed of two sections 33 and 34, respectively. Adjacent to the shaft 27, one of the brackets 25 has an extension 32 into which is threaded a short shaft or rod 31, the latter forming a hinge connection for one end of the parts 33 and 34. The opposite ends of these parts have outstanding ears 35 provided with slots, and to one of these ears is pivoted, as indicated at 37, a bolt 38 which is so located that it may be swung into and out of the slots. The bolt carries a nut 39 which may be operated to clamp the parts 33 and 34 around the drum 30 to obtain the desired braking action. The outer end of the shaft 31 has a hand wheel 32ª for longitudinal adjustment of said shaft, so that the parts 33 and 34 may be properly engaged with the drum 30. The braking or take-up device hereinbefore described prevents the paper strip from unrolling too fast, and takes up any slack in the same.

The strip of paper is indicated at 40. From the roll 29 the paper strip passes to a guide roller 41 positioned between the uprights 22 slightly below the level of the shaft 27. This roller is journaled in bearing blocks 42 which are vertically slidable in frames 43 secured to the inner faces of the uprights 22. Above the bearing blocks 42 in each frame 43 is a stout coiled spring 44 which serves to depress the block and the roller 41, to take the curl out of the paper strip as it comes from the roll. A screw 45 threaded through the top of the frame 43 is provided for the purpose of adjusting the tension of the spring 44. The machine is provided with a number of yieldable shaft bearings of the type just described, some of which, however, do not employ a spring but only a screw to raise or lower the bearing block. No novelty is claimed for these devices, and the only purpose for using them is to render the shaft yieldable with the use of the spring, or to render the shaft readily adjustable for leveling and accuracy of contact by means of the screws. Hence, for the sake of convenience the first-mentioned type will be called a yieldable bearing and the other an adjustable bearing.

The paper strip 40 passes upward from the roller 41 and is trained over a roller 47 which is journaled in the uprights 22, and then it continues in a practically horizontal path rearward to be operated on by the cutting, paste applying and folding devices.

The first unit of the mechanism which the paper strip 40 encounters is a pair of superposed main feed rollers 48 and 49, respectively, the roller 48 being at the top. The next unit is a pair of auxiliary feed rollers 55 and 56, the roller 55 being at the top. These rollers, as well as all the other rollers to be described later, extend transversely of the machine in horizontal position, and they are for the most part journaled by means of their shafts in the top rails 20 of the frame.

The shaft 50 of the feed roller 48 is journaled in yieldable bearings 51, and the shaft 52 of the roller 49 is journaled in the top rails 20 of the frame. These two last-mentioned rollers are in vertical alinement and they are short and do not extend throughout the entire width of the machine as their only function is to propel the paper strip; they also differ in diameter, the bottom roller 49 being the larger. The auxiliary feed rollers 55 and 56 are mounted in the same manner as the main feed rollers 48 and 49, the roller 56 being of greater length than the roller 49, but of the same diameter, and the roller 55 being of the same length and diameter as the roller 48.

Back of the roller 56, in the same horizontal plane, is a shaft 57, and back of this shaft is a roller 58 of the same diameter as the rollers 49 and 56, the shaft 57 and the roller 58 being journaled in the top rails 20 of the frame. Above the roller 58 is a roller 59 of the same length and diameter and carried by a shaft 60 which is journaled in special bearings to be described later. The paper strip passes between the rollers 58 and 59 after it leaves the auxiliary feed rollers 55 and 56.

The hereinbefore described assembly of rollers, four of which are of the same diameter, is designed for the purpose of feeding the paper, and these rollers are connected by gears and driven by an electric motor 61 set on a shelf 62 directly below the shaft 57. Of course, it will be understood that any other suitable power source may be provided. The motor 61, through a pair of gears 63, transmits motion to a gear 64 fast on one end of the shaft 57. The shaft 57 has two gears 64ª and 65 within the space between the top rails 20 of the frame, and on the outside of one of said rails the shaft 57 has a pinion 66 on the side opposite to that side carrying the gear 64. By means of two independently journaled intermediate gears 67 and 68, the pinion 66 transmits motion to a gear 69 fast on one end of the shaft 52 carrying the roller 49. Inside the top rails 20 the shafts of the rollers 49, 56, 58 and 59 are provided with intermeshing gears 70, 71, 72 and 73, respectively, all of the same size and driven by a gear 65 fast on the shaft 57. The gear 70, however, is loosely mounted on the shaft 52, and said shaft receives motion from the shaft 57 through the gears 67, 68 and 69 as hereinbefore described. The purpose of having the gear 70 loose on the shaft 52 will be explained hereinafter. Inside the rails 20 the shaft 52 of the roller 49 carries a loose gear 70ª, and the roller 56 carries a loose gear 71ª, these gears being identical with their mates 70 and 71, the gear 71ª being driven by the gear 64ª and driving the gear 70ª. The gear 71 is loose on the shaft of the roller 76. The purpose of the gear 64ª is to impart motion to the roller 56 at both ends, for easy operation.

The gears 70 and 71, as well as gears 70ª and 71ª, carry disk cams 74 and 75, respectively, and the shafts of the rollers 48 and 55 carry two collars 76 each adapted to follow the contour of said cams. The cams 74 have a projection 77, while the cams 75 have a depression 78 in their peripheries, the drive gearing being set so that the projection and the depression are always in the same horizontal plane, i. e., both reach the top and the bottom at the same time. Thus, the roller 49 is able to feed nearly an entire revolution, while the roller 56 feeds during the remainder of the time, or when the roller 49 does not feed.

As the frictional engagement of each pair of feed rollers serves to propel the paper, it will be seen that the rise of either the roller 48 or 55 will loosen the grip on the paper strip at that particular point. Thus, the rollers 48 and 49 feed the paper strip all the time except when the roller collar 76 mounts the cam projection 77, and during the time the rollers 48 and 49 feed the paper strip, the collar 76 of the roller 55 following the periphery of the cam 75, keeping the roller 55 elevated and free of the paper strip which is being fed forward by the rollers 48 and 49. However, when the collar 76 of the roller 48 mounts the cam projection 77, the collar 76 of the roller 55 falls into the depression 78 of the cam 75, so that for a limited time the rollers 55 and 56 only are feeding the paper. The object of this arrangement of main and auxiliary feed rollers operating alternately is to enable the machine to be used for making envelops of different sizes, as will be described hereinafter.

The rollers 59 and 58, more clearly shown in Figs. 4 and 5, cut the envelop blank from the paper strip, and also make two transverse creases defining the top and bottom flaps of the blank. The roller 59 is armed with knives 79 and creaser strips 80 arranged as clearly shown in Fig. 5 and the roller 58 has grooves 79$^a$ and 80$^a$ corresponding to the knives and creaser strips. The knives and creaser strips are arranged to cut out opposite edges of the paper strip and to sever the strip midway between the cut out portions, and, furthermore, to make creases in the strip transversely in line with the opposite edges of the cut out portions to form the top and bottom flaps of the envelop blank. The side portions of the paper strip which remain intact form the side flaps of the envelop blank.

The rollers 56 and 58 are geared to run in the same direction and at the same rate of speed, this feature making it certain that the roller 56 can feed the paper strip uniformly, while the rollers 59 and 58 cut and crease the strip. The cutting and creasing operation consumes a limited time, and the rollers 55 and 56 only feed the paper strip at this time, this being made possible by the operation of the cams 75 hereinbefore described.

If the machine is to make a larger envelop, it will be necessary first to change the knives, etc., of the rollers 59 and 58. This will not affect the machine so far as the width of the envelop is concerned as the rollers 59 and 58 are sufficiently long for this purpose. The increased length of the envelop will affect the machine, however, as the roller 56 would ordinarily turn too slowly. Hence, it will be necessary to speed up the rollers 48 and 49 so that they will push along a greater length of paper strip between the rollers 55 and 56 and the cutting rollers 58 and 59. This is possible because with the main feed rollers 48 and 49 feeding most of the time, the auxiliary feed rollers 55 and 56 will be in spaced relation and will let the paper strip slide freely therebetween; also it will be noted that the rollers 58 and 59 do not propel the paper strip, the knives and creasers only functioning. Hence, the paper strip can be easily slipped between these rollers as long as the knives have not met the grooves of the roller 58.

The function of the loose gears 70 and 70$^a$ is to actuate the cams 74 at the same rate of speed as the cutting rollers 58 and 59, to obtain the results hereinbefore noted. However, as far as the roller 49, actuated by the gear 69, is concerned, the making of longer envelops requires a greater speed for said roller, and to obtain this necessitates only a change in the gears 67 and 68. It will be remembered that the rollers 48 and 49 are in contact most of the time, whereas the rollers 55 and 56 are in contact only for a short period, and the rollers 58 and 59 are always spaced, only the knives 79 and creaser strips 80 meshing during a part of the revolution with the grooves 79$^a$ and 80$^a$. Now, assuming that the rollers 55 and 56 are out of contact, and the knives and creaser strips have not yet met the grooves, the rollers 48 and 49, at a given speed, project a certain length of paper through the space between the pairs of rollers 55, 56 and 58, 59. It will be evident that if the rollers 48 and 49 are sped up, a greater length of paper is projected forward through the spaces between the rollers 55, 56 and 58, 59 during the same length of time it took to project a shorter length. Any combination of gears 67 and 68 may be interposed between the gears 66 and 69; or the gear 69 can be removed and a smaller one substituted therefor to obtain more speed for the roller 49.

As the blank cut from the paper strip issues from the rollers 58 and 59, the device shown more particularly in Fig. 8 is met. This comprises two claws 81 carried by a cross bar 82 and located directly under the blank as it issues from between the rollers, and near the edge of the blank beneath the two waste pieces 83 cut out by the knives. As the blank advances, the claws rise, and push up against the material just ahead of the waste pieces, after which they drop back, thus deflecting the waste pieces. The motion of the rollers 58 and 59 will force the waste pieces downwardly, while the remainder of the blank continues in a level path, and said waste pieces will drop into a suitable receptacle 84 which latter may also be made in the form of a hopper fitted with an exhaust fan to promote the immediate discharge of the waste pieces.

The action of the claws 81 is governed by a cam 85 at each end of the shaft 86 of the roller 58, the cam acting on the inclined portion 87 of a side lever 88 which is pivoted to the upright 24 as indicated at 89. At an intermediate point, the levers 88 take the ends of the cross bar 82.

As hereinbefore stated, the cutting roller 59 is journaled in a special bearing so constructed that it permits a close adjustment of the roller in a direction parallel to its axis. The necessity for accurate adjustment in this direction is clearly obvious when it is considered that the impressing and cutting members must be made to register correctly. This special bearing is illustrated in Figs. 6 and 7, one such bearing being provided for each end of the shaft. It will be understood that the adjustment referred to is not sufficient to affect the meshing of the gears 72 and 73. Referring specifically to Figs. 6 and 7 the bearing for the shaft 60 of the roller 59 is shown at 205, the same being a circular sleeve the bore of which is slightly off the center. The sleeve fits into a support 206 on the top rail 20 and has a circular flange 207 at its outer end. It will be seen that by turning the flange 207 the position of the roller 59 may be slightly shifted as explained hereinbefore. In order to fix the roller in adjusted position, the flange 207 has two arcuate slots 208 through each of which a bolt 209 is passed and threaded into the support 206. By slightly backing these bolts the flange may be turned to effect the adjustment of the roller.

After the paper strip has been cut and issues from between the rollers 58 and 59, it passes to the creaser, gumming and folding devices described in detail in the parent application, Serial No. 96378, filed May 9, 1916.

I claim:

1. In an envelop machine, a cutter for forming an envelop blank from a strip of paper, a pair of main feed rollers, a pair of auxiliary feed rollers located between the cutter and the main feed rollers, means for driving the auxiliary feed rollers at the same rate of speed the cutter operates, and means for alternately retracting one of the members of the respective pairs of feed rollers into inoperative position.

2. In an envelop machine, a cutter for forming an envelop blank from a strip of paper, main and auxiliary pairs of strip feeding rollers, a yielding support for one of the members of each pair of feed rollers, driving means for the other members of the pairs of feed rollers, said member of the pair of auxiliary feed rollers operating at the same rate of speed as the cutter, and means for retracting the other members of the respective pairs of feed rollers alternately.

3. In an envelop machine, a cutter for forming an envelop blank from a strip of paper, a pair of main feed rollers, a pair of auxiliary feed rollers located between the cutter and the main feed rollers, a yielding support for one of the members of each pair of feed rollers, driving means for the other members of the pairs of feed rollers, said member of the pair of auxiliary feed rollers operating at the same rate of speed as the cutter, and means for retracting the other members of the respective pairs of feed rollers alternately.

4. In an envelop machine, a cutter for forming an envelop blank from a strip of paper, main and auxiliary pairs of strip feeding rollers, a yielding support for one of the members of each pair of feed rollers, driving means for the other members of the pairs of feed rollers, said member of the pair of auxiliary feed rollers operating at the same rate of speed as the cutter, and lifting means carried by the driven members of the pairs of rollers and set to alternately retract the other members of the pairs of rollers, the lifting means on the auxiliary roller turning therewith, and the lifting means on the main roller being rotatable independent thereof.

5. In an envelop machine, a cutter for forming an envelop blank from a strip of paper, a pair of main feed rollers, a pair of auxiliary feed rollers located between the cutter and the main feed rollers, a yielding support for one of the members of each pair of feed rollers, driving means for the other members of the pairs of feed rollers, said member of the pair of auxiliary feed rollers operating at the same rate of speed as the cutter, and lifting means carried by the driven members of the pairs of rollers and set to alternately retract the other members of the pairs of rollers, the lifting means on the auxiliary roller turning therewith, and the lifting means on the main roller being rotatable independent thereof.

In testimony whereof I affix my signature.

WILLIAM P. HUGUELET.